March 8, 1932.  H. R. STANDLEE  1,848,500
OIL SAVER
Filed May 2, 1929   3 Sheets-Sheet 3
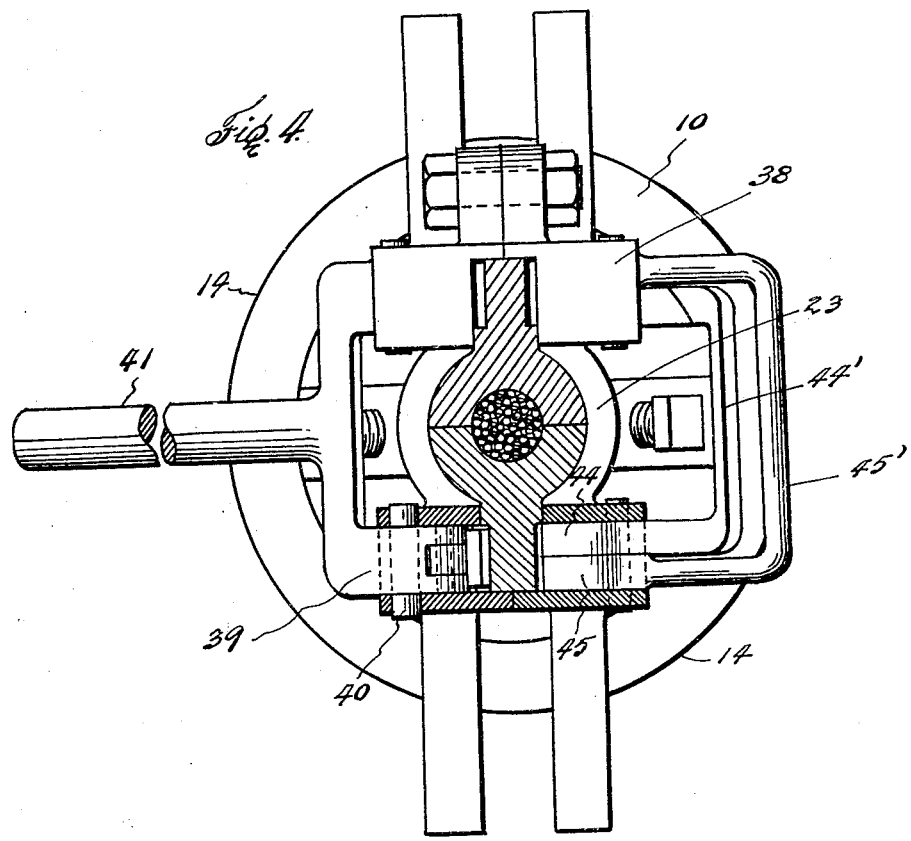
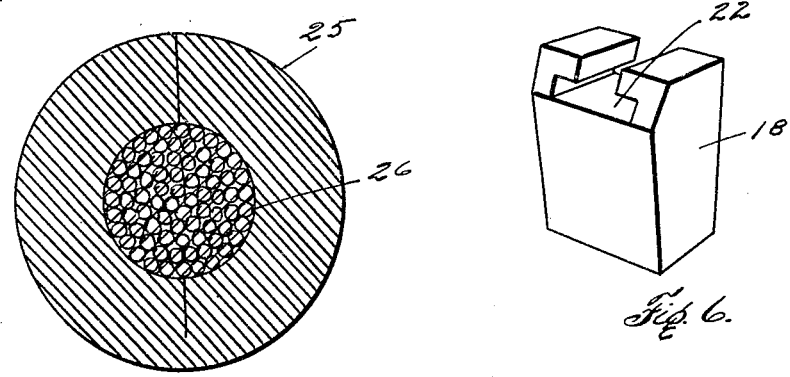
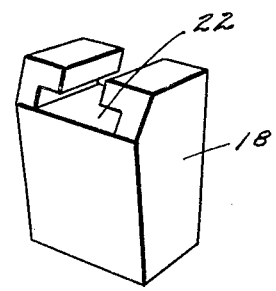

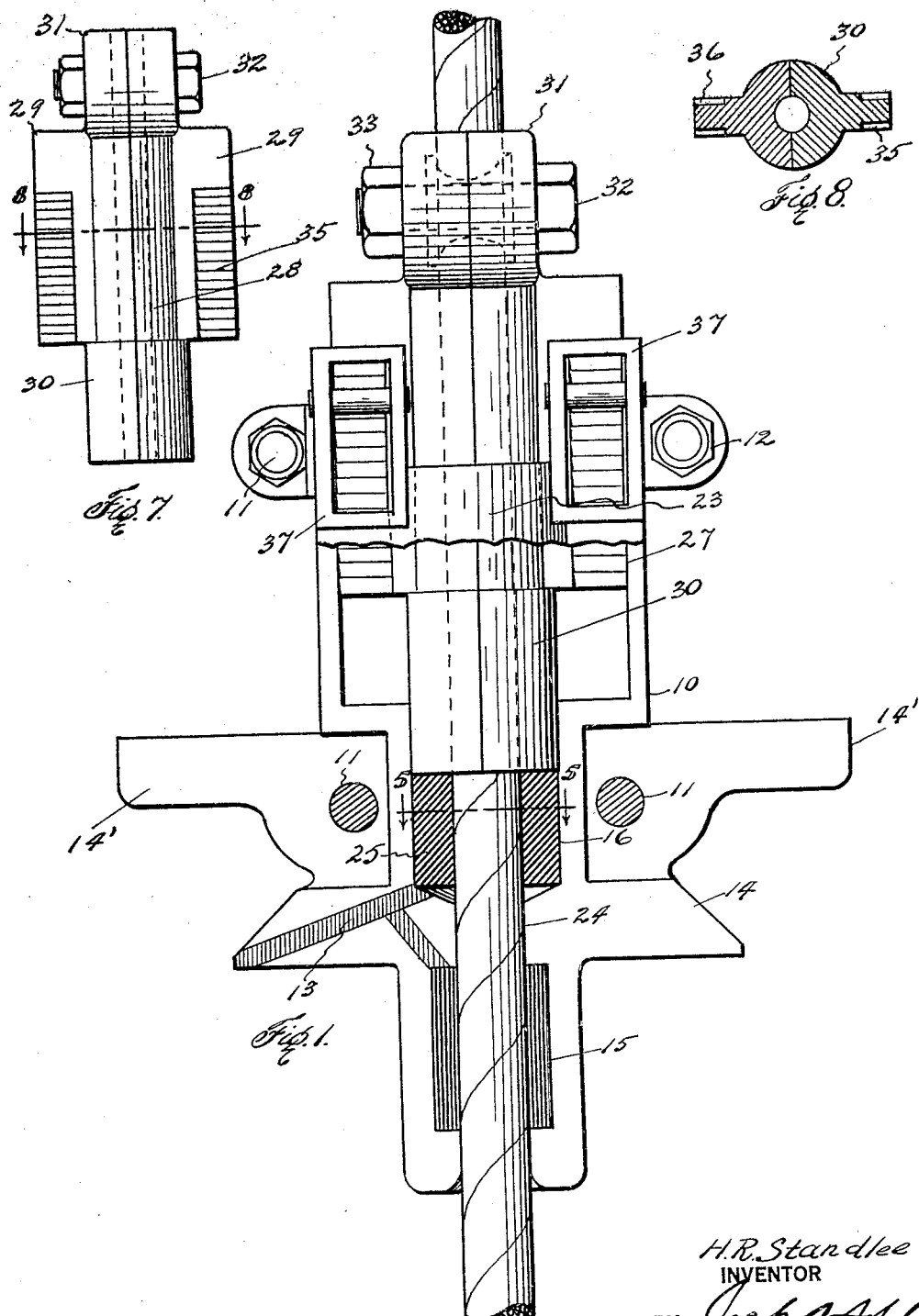

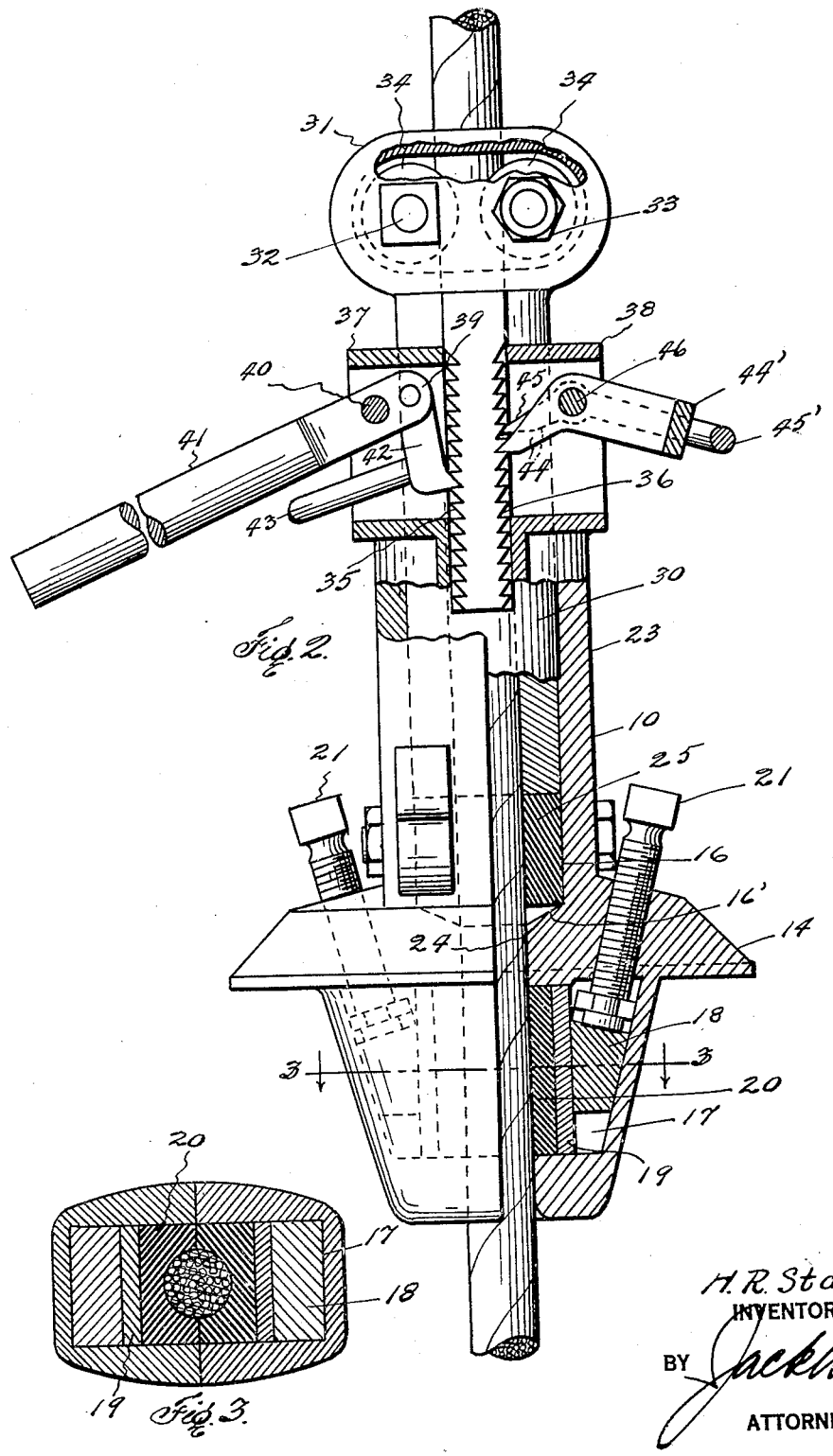

Patented Mar. 8, 1932

1,848,500

UNITED STATES PATENT OFFICE

HARVEY R. STANDLEE, OF TULSA, OKLAHOMA, ASSIGNOR TO THE GUIBERSON CORPORATION, OF DALLAS, TEXAS, A CORPORATION OF DELAWARE

OIL SAVER

Application filed May 2, 1929. Serial No. 359,884.

This invention relates to new and useful improvements in oil savers.

The invention has particularly to do with oil savers for use on cables and is of the same type as my co-pending application executed of even date herewith.

One object of the invention is to provide packing compressing means and a step by step actuated device for forcing the compressing means downward to cause the packing to grip the cable, whereby the packing may be quickly and gradually compressed against varying head pressures.

A further object of the invention is to provide a ratchet device arranged to compress the packing by short intermittent movements, thus giving a quick as well as sensitive adjustment to the packing compressing means.

Another object of the invention is to provide latching means for the ratchet device whereby the latter is held in its adjusted positions as well as being quickly released.

A construction designed to carry out the invention will be hereinafter described together with other features of the invention.

The invention will be more readily understood from a reading of the following specification and by reference to the accompanying drawings in which an example of the invention is shown, and wherein:

Fig. 1 is a view partly in elevation and partly in section, showing a device constructed in accordance with the invention, Fig. 2 is a similar view and at right angles thereto, Fig. 3 is a horizontal cross-sectional view taken on the line 3—3 of Fig. 2, Fig. 4 is a plan view, portions being shown in section, Fig. 5 is an enlarged cross-sectional view taken on the line 5—5 of Fig. 1, Fig. 6 is a perspective view of one of the wedge blocks, Fig. 7 is an elevation of the follower sleeve, and Fig. 8 is a cross-sectional view taken on the line 8—8 of Fig. 7.

In the drawings the numeral 10 designates a vertically split housing comprising complementary members. The housing members are secured together by bolts 11 and nuts 12. By employing four bolts the housing may be readily and easily assembled or disassembled. Suitable packing strips 13 are interposed between the housing members.

The housing includes a horizontal annular flange 14 below which is located a lower packing chamber 15 and above which extends an upper packing chamber 16. The flange is suitable for supporting the device in a casing head as is shown in Figure 1. The lower packing chamber 15 will be below the top of the casing head and thus the projection of the device above said head will be reduced.

The lower packing chamber has opposite guides 17 (Figures 2 and 3) which receive sliding wedge blocks 18 resting against upright shoes 19. The shoes have their rear faces flat to receive the blocks and their front faces flat to embrace opposite sides of an angular packing member or sleeve 20 fitting in the lower chamber.

Adjusting screws 21 are threaded through the flange at the same angles as the outer walls of the guides 17. Each wedge block 18 has a key slot 22 (Figures 2 and 6) for receiving the lower end of one of the screws, whereby the blocks are suspended in the guides. By rotating the screws the blocks are slid downwardly and inwardly, thus displacing the shoes 19 inwardly and compressing the packing sleeve about the cable, rod, tube or other element which passes through the device. Hold-down jaws 14' are located on each side of the housing for securing it against upward displacement.

The housing is formed with a vertical shank 23 extending upwardly from the flange 14 and in which the upper packing chamber 16 is formed. The flange has a reduced opening 24 through which the cable passes and thus said flange forms a top for the lower packing chamber, whereby the sleeve 20 is retained.

The upper packing chamber 16 has an inclined annular bottom 16' and receives a cylindrical packing sleeve 25, which will more closely embrace the cable or other element which it surrounds, when forced down said inclined bottom. The packing sleeve 25 is formed of rubber or any material suitable for the purpose and while various types of cylindrical packing members could be used I prefer to use the sleeve herein set forth. The sleeve is split vertically one side to its bore 26 (Fig. 5), while on the opposite side it is split nearly to its outer wall to form a vertical hinge, whereby the sleeve may be opened for engaging it around a cable, rod or tube as the case may be.

The shank 23 is formed on each side with enclosed vertical guide ways 27 which terminate some distance above the packing 25, as is shown in Figure 1. A follower sleeve 28 is slidable in the bore of the shank and has opposite vertical wings 29 slidable in the guideways 27, the downward movement of the sleeve being limited by said wings engaging the bottoms of the guideways. The sleeve 28 has an enlarged collar 30 at its lower end extending below the wings and resting on the packing 25.

The sleeve 28 is made of complementary sections and has an enlarged head 31 at its upper end receiving bolts 32 whereby the sleeve is secured together. The bolts are fastened by nuts 33 so that by removing the latter the sleeve may be disassembled for placing on the cable, rod or other element. Grooved guide rollers 34 are journaled in the head on the bolts 32.

The wings 29 are provided on one side with ratchet teeth 35 and on the opposite side with similar ratchet teeth 36, as is best shown in Figure 2. At the upper end of the shank 23 are mounted boxes 37 and 38 on opposite sides. In the boxes 37 the jaw 39 of an operating lever is journaled on pins 40. A suitable handle 41 extends from the jaw. Inwardly of the pins 40 depending pawls 42 are pivotally supported on the inner ends of the jaw so as to engage the teeth 35. The pawls 42 are connected by a rigid yoke 43 which has a tendency to swing downward and thus throw said pawls into engagement with the ratchet teeth 35.

It will be observed from Figure 2 that when the handle 41 is pulled upwardly the pawls 42 will force the sleeve 28 downwardly to compress the packing 25 and when the said handle is swung downwardly the dogs will be raised to engage the next tooth. It is obvious that means must be provided for holding the sleeve against upward displacement when the packing 25 is compressed and for this purpose a pair of retaining dogs 44 and 45 respectively, are journaled on pins 46 in the boxes 38 and engage the ratchet teeth 36. The dogs 44 are connected by a yoke handle 44', while the dogs 45 are connected by a yoke handle 45', said handles tending to swing downward and holding the dogs in engagement with the ratchet teeth.

As is shown in Figure 2, when one set of dogs, as for instance 44, are seated in the teeth the other set of dogs 45 are positioned between the teeth. This is necessary in order to obtain a proper compression of the packing and enable it to be compressed in stages less than the distance of one tooth. It also permits coarser teeth to be used than if only one pair of dogs was employed.

Various changes in the size and shape of the different parts, as well as modifications and alterations, may be made within the scope of the appended claims.

What I claim, is:

1. In an oil saver, a housing having a vertical packing chamber, a compressible packing member located in the housing chamber and having a vertical bore for receiving a movable element to be packed, follower means for compressing said packing member, ratchets carried by the follower means, actuating means mounted on the housing and engaging the ratchets, and retaining means engaging the ratchets.

2. In an oil saver, a housing having a vertical packing chamber, a compressible packing member located in the housing chamber and having a vertical bore for receiving a movable element to be packed, a follower sleeve mounted in the housing for engaging the packing member, wings extending from the sleeve and having ratchet teeth, actuating means having pawls engaging said teeth to depress said sleeve, and retaining means for holding said sleeve depressed.

3. In an oil saver, a housing having a vertical packing chamber, a compressible packing member located in the housing chamber and having a vertical bore for receiving a movable element to be packed, a follower sleeve mounted in the housing for engaging the packing member, wings extending from the sleeve and having ratchet teeth, a lever member pivoted to the housing, and pawls carried by the lever member and engaging the ratchet teeth.

4. In an oil saver, a housing having a vertical packing chamber, a compressible packing member located in the housing chamber and having a vertical bore for receiving a movable element to be packed, a follower sleeve mounted in the housing for engaging the packing member, wings extending from the sleeve, each wing having ratchet teeth, a jaw pivoted to the housing and having pawls engaging ratchet teeth of the wings, a handle lever attached to the jaw for actuating the same, retaining dogs mounted on the housing and also engaging ratchet teeth of the wings, and means for releasing the dogs.

5. As a sub-combination in an oil saver, a packing compressing and guide sleeve comprising two complementary members each having a longitudinal wing provided with ratchet teeth, a head at one end of the sleeve, guide rollers mounted in the head, and means for securing the members of the sleeve together.

6. In an oil saver, a housing, a supporting flange surrounding the housing, said housing having a vertical bore above said flange and also provided with vertical guide channels on each side of the bore, a compressible packing sleeve fitting in the bore of the housing, a follower sleeve resting upon the packing and having wings engaging in the guide channels of the housing, ratchet teeth on both sides of said wings, a jaw pivoted on the housing and having pawls engaging the teeth on one side of each wing, means for swinging the jaw, and retaining dogs pivoted to the housing and engaging the teeth on the opposite side of the wings.

7. In an oil saver, a housing having a vertical packing chamber for receiving a vertical movable element passing therethrough, a compressible packing member located in the housing chamber and having a vertical bore for receiving said movable element, follower means in said housing for compressing said packing member, means on the housing engaging the follower, means for automatically holding said follower means against retraction as said follower means advances step by step, and means for imparting a step by step movement to the follower means for compressing said packing member, the holding means automatically acting separate from the actuating means to retain the follower means while the actuating means is being reset for a fresh step.

8. In an oil saver, a housing having a vertical packing chamber for receiving a vertical movable element passing therethrough, a compressible packing member located in the housing chamber and having a vertical bore for receiving said movable element, follower means in said housing for compressing said packing member, a pair of retaining dogs on one side of the housing engaging the follower member for holding it in adjusted position, and an actuating lever mounted on the opposite side of the housing and having a pawl for engaging the follower member.

9. In an oil saver, a housing having a vertical packing chamber for receiving a vertical movable element passing therethrough, a compressible packing member located in the housing chamber and having a vertical bore for receiving said movable element, follower means in said housing for compressing said packing member, a pair of retaining dogs on one side of the housing engaging the follower member for holding it in adjusted position, and an actuating lever mounted on the opposite side of the housing and having a pawl for engaging the follower member, the follower member having opposite rows of ratchet teeth for receiving the retaining dogs and the actuating pawl.

10. In an oil saver, a housing having a vertical passage therethrough, an upper packing member disposed in said passage, a follower sleeve resting upon the packing, flat wings projecting outwardly from each side of the sleeve, said wings extending a substantial distance longitudinally along the sleeve, and means engaging said wings for depressing said sleeve to compress said packing member.

In testimony whereof I affix my signature.

HARVEY R. STANDLEE.